L. E. ROBY & C. A. PATTISON.
FERTILIZER DISTRIBUTER.
APPLICATION FILED MAR. 5, 1907.
900,124.
Patented Oct. 6, 1908.
2 SHEETS—SHEET 2.
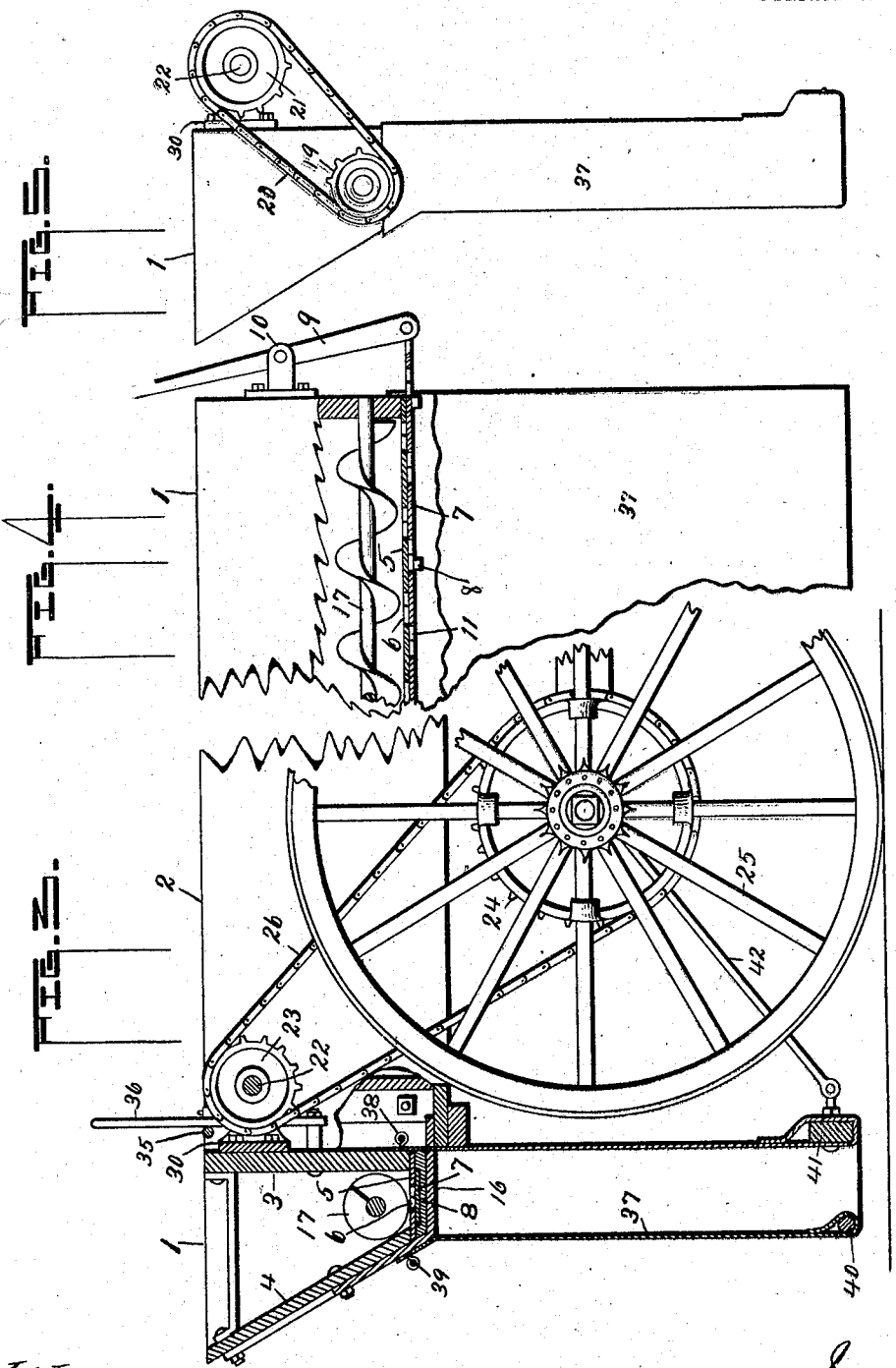

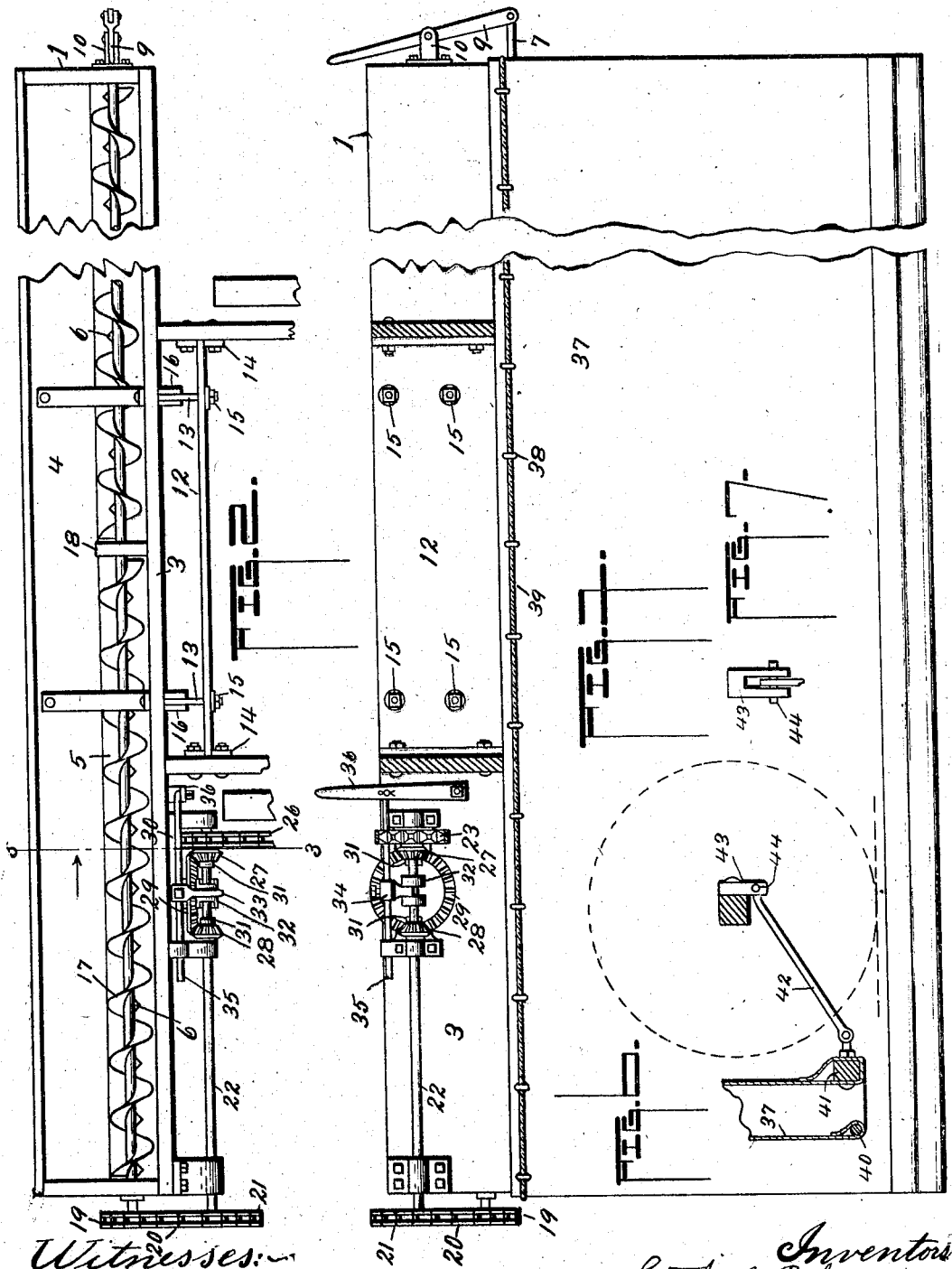

UNITED STATES PATENT OFFICE.

LUTHER E. ROBY AND CLARENCE A. PATTISON, OF PEORIA, ILLINOIS.

FERTILIZER-DISTRIBUTER.

No. 900,124.

Specification of Letters Patent.

Patented Oct. 6, 1908.

Application filed March 5, 1907. Serial No. 360,691.

*To all whom it may concern:*

Be it known that we, LUTHER E. ROBY and CLARENCE A. PATTISON, citizens of the United States, residing at Peoria, in the county of Peoria and State of Illinois, have invented certain new and useful Improvements in Fertilizer-Distributers; and we do hereby declare that the following is a full, clear, and exact description of the invention, which will enable others skilled in the art to which it appertains to make and use the same.

This invention has reference to fertilizer distributers and the object of our invention is to provide a machine that may be mounted on an ordinary wagon and will distribute fertilizer material, whether in a finely divided state or lumpy condition and whether dry or damp, evenly across a track of considerable width.

In the accompanying drawings, which illustrate a machine embodying our improvements, Figure 1 is a view of the machine taken on a plane through the bed of the wagon, on which it is supported, looking toward the front thereof; Fig. 2 a top view of the machine; Fig. 3 a vertical cross sectional view on the line 3—3 of Fig. 2 looking as indicated by the arrow; Fig. 4 a view of a portion of one end of the machine showing the lower portion of the receptacle in vertical section on a plane through the discharge openings; Fig. 5 a view looking at the opposite end of the machine, from that shown in Fig. 4; Figs. 6 and 7 are detailed views showing the manner of connecting the apron of the machine to the wagon.

1 is a long containing receptacle or hopper which is supported transversely on the rear of an ordinary wagon bed 2, so as to project equally at each side thereof. The side 3 of the hopper adjacent the wagon bed lies in a vertical position when mounted on the wagon and the opposite side 4 thereof inclines downwardly as shown so as to form a contracted bottom, which is closed by the plate 5 which has the diamond shaped openings 6 arranged at suitable intervals throughout the length thereof, the said openings being preferably arranged with their major axes extending lengthwise of the hopper. The plate 7 supported directly beneath and in contact with the bottom 5 by the cross pieces 8 which are secured to the bottom of the hopper and cutaway to receive said plate is movable lengthwise of the hopper by means of the lever 9 which is pivoted thereto at one end and to the bracket 10 on the end of the hopper. This plate 7, extends entirely throughout the length of the hopper and is provided with openings 11, corresponding with the openings 6 in the bottom 5 and so arranged in said plate that in one position thereof they all register simultaneously with the corresponding openings in the bottom 5 of the hopper and in another position of said plate are wholly out of registry with the openings 6 the webs of material between the openings 11, in effect closing the bottom 5.

An end gate board 12 is loosely carried on and suitably distanced from the front piece 3 of the hopper by means of the bolts 13 and is adapted to fit in the end gate ways 14 at the rear of the wagon bed 2, and when so inserted, the nuts 15 are tightened on the bolts 13 so as to draw the hopper securely against the end of the wagon bed, and the hopper is supported in position by the straps 16 which have the projecting ends thereof arranged to rest upon the bottom of the wagon bed, when the receptacle is in position thereon.

In the bottom of the hopper 1 and extending from end to end thereof is an auger conveyer 17 of sufficient diameter to fill the contracted bottom of the hopper. This auger is journaled at its center in the partition 18 and the blades on said auger at each side of the partition extend in opposite directions as shown so as to convey material simultaneously in opposite directions on the opposite sides of the partition. At one end of the hopper the shaft of the auger projects through the end and has the sprocket 19 mounted thereon around which is passed the chain 20 driven from the sprocket 21 on the shaft 22. This shaft 22 is journaled in bracket bearings on the side 3 of the hopper and extends to a point adjacent the side board of the wagon, and has the sprocket 23 loosely mounted thereon on a line with the sprocket 24 which is fixed on the ground wheel 25 of the wagon, and has the chain 26 passed therearound, and around said sprocket 23 so as to drive said sprocket 23 when the wagon is moved. A beveled gear 27 fixed on the face of the sprocket 23 and a similar beveled gear 28 loosely mounted on said shaft facing the first mentioned beveled gear, mesh with the large beveled gear 29 on a bracket 30 secured to the side 3 of the hopper. The beveled gears 27 and 28 have the clutch lugs 31 which are adapted to be engaged by the clutch member 32 keyed on the shaft 22 in the usual manner so as to rotate with said shaft and be capable of longitudinal movement thereon so that it may be moved into engagement with either of the beveled gears 27 and 28 or to a point midway thereof out of engagement with both. This clutch member 32 is annularly grooved and has the collar 33 engaging said groove in the usual manner for shifting said clutch and said collar is integral with the bracket 34 of the rod 35 which has one end thereof passing through a bearing in the bracket 30 and the other end thereof pivotally secured to the lever 36 on the side 3 of the hopper within convenient reach of the operator. As is apparent, when the wagon is being drawn across the field, the beveled gear 27 rotates on the shaft 22 with the sprocket 23 and the beveled gear 28 is rotated in the opposite direction through the intermediate beveled gear 29 so that by shifting the clutch part 32 into engagement with the said beveled gears, the auger 17 may be caused to rotate in either direction at the will of the operator.

The fertilizer is delivered from the hopper in a somewhat finely divided condition and to effect even distribution, the apron 37 of canvas or other flexible material is provided, which surrounds the hopper at the bottom and depends downwardly to the ground to protect the fertilizer as it falls from the machine from being blown about by the wind. This apron is preferably secured to the hopper by means of the eyelets along the upper edge thereof, which engage the hooks 38, which said hooks have the cord 39 passed through the eyes thereof outside the apron to hold the apron thereon.

The bottom of the apron is provided at the rear side with a rod 40 extending across the machine to give it weight to hold it in position and the front is provided with the heavy beam 41 extending correspondingly for a similar purpose and the said beam is connected to the running gear of the wagon by means of the links 42. The links are preferably connected to the divided or bifurcated blocks 43 on the wagon by means of the wooden pins 44 which pass through the perforations in both parts of the blocks 43 and the perforations in the end of the link 42, the said wooden pins being of sufficient strength to resist the ordinary strain thereon from the cross piece 41 and break when subjected to unusual strain and permit the cross piece to swing rearwardly out of the way of the obstruction.

In operation, the fertilizing material is deposited in the hopper 1 from the wagon upon which it is carried in the center at the rear of the wagon. The lever 36 is shifted to throw the clutch 32 into engagement with the beveled gear 27 which operates the auger 17 to move the fertilizer across the openings 6 in the bottom thereof, to the opposite ends of the hopper, which movement feeds the fertilizer to all the discharge openings. When the fertilizer begins to accumulate at the ends of the hopper, the clutch 32 is shifted into engagement with the beveled gear 28 and the auger driven in the opposite direction, which moves the fertilizer back across the openings 6 to the center of the hopper. By shifting the lever 36 the fertilizer may be carried back and forth across the openings 6 and evenly discharged through said openings and distributed onto the ground.

We claim

1. In a fertilizer distributer, the combination of a containing receptacle provided with discharge openings, means for mounting the said receptacle on the rear end of a wagon, a flexible inclosed apron or shield with which the discharge openings communicate, a weight member carried by said apron at the bottom thereof, and a brace connecting said weight member to a part on the wagon.

2. In a fertilizer distributer, in combination, a containing receptacle having discharge openings, means for mounting the receptacle on the rear end of a wagon, a flexible inclosed apron or shield with which the discharge openings communicate, a weight member carried by said apron at the bottom thereof, a bolt passing through the apron and the weight member, a brace pivoted to the projecting end of the bolt and a frangible connection between the brace and a part of the wagon.

3. In a fertilizer distributer, the combination of a containing receptacle having discharge openings, means for mounting the receptacle on the rear end of a wagon, a flexible inclosed apron or shield with which the discharge openings communicate a weight member carried by said apron at the bottom thereof, a brace connected to said weight member and a frangible connection between said brace and a part of the wagon.

In testimony whereof we have affixed our signatures, in presence of two witnesses.

LUTHER E. ROBY.
CLARENCE A. PATTISON.

Witnesses:
H. V. GIBSON,
E. M. GILES.